United States Patent
Tessier et al.

(10) Patent No.: US 12,149,107 B2
(45) Date of Patent: Nov. 19, 2024

(54) SYSTEM AND METHOD USING WIRELESS LATCHING RELAY FOR VEHICLE FLEET MANAGEMENT INVENTORY

(71) Applicant: FORTIN SYSTÈMES ÉLECTRONIQUES, Anjou (CA)

(72) Inventors: Martin Tessier, Repentigny (CA); Mathieu Bertrand-Collin, Sainte-Marthe-sur-le-lac (CA); Vincent Fortin, Montreal (CA); Alexandre Roy-Langlois, Laval (CA); Duc Minh Cong Nguyen, St-Leonard (CA)

(73) Assignee: FORTIN SYSTÈMES ÉLECTRONIQUES, Anjou (CA)

( * ) Notice: Subject to any disclaimer, the term of this patent is extended or adjusted under 35 U.S.C. 154(b) by 217 days.

(21) Appl. No.: 17/929,093

(22) Filed: Sep. 1, 2022

(65) Prior Publication Data
US 2023/0062323 A1    Mar. 2, 2023

Related U.S. Application Data (60) Provisional application No. 63/260,803, filed on Sep. 1, 2021.

(51) Int. Cl.
*H02J 7/00* (2006.01)
*B60R 16/033* (2006.01)

(52) U.S. Cl.
CPC .......... *H02J 7/0031* (2013.01); *B60R 16/033* (2013.01); *H02J 7/0063* (2013.01)

(58) Field of Classification Search
CPC ...... H02J 7/0031; H02J 7/0063; B60R 16/033
USPC .............................................................. 701/2
See application file for complete search history.

(56) References Cited

U.S. PATENT DOCUMENTS

| | | | | |
|---|---|---|---|---|
| 9,931,932 B2* | 4/2018 | Howard | ................ | H04W 84/10 |
| 10,814,833 B1* | 10/2020 | Goetzinger | ............ | B60R 25/23 |
| 2002/0031700 A1* | 3/2002 | Wruck | ................ | H01M 50/583 |
| | | | | 429/61 |
| 2013/0255335 A1* | 10/2013 | Jonely | ..................... | E05B 17/22 |
| | | | | 70/277 |
| 2019/0017311 A1* | 1/2019 | McGettrick | ........... | E05F 15/697 |
| 2019/0256041 A1* | 8/2019 | Tinoco | ................ | G01R 33/072 |
| 2021/0202921 A1* | 7/2021 | Reimer | ............... | H01M 10/425 |
| 2022/0266451 A1* | 8/2022 | Cristache | ............. | G05D 1/0297 |

(Continued)

FOREIGN PATENT DOCUMENTS

| | | | | |
|---|---|---|---|---|
| BR | 112020019150 A2 * | 1/2021 | .......... | B60R 16/023 |
| CN | 110924330 A * | 3/2020 | | |
| CN | 109696869 B * | 6/2023 | .......... | G05B 19/042 |

(Continued)

*Primary Examiner* — Atul Trivedi
(74) *Attorney, Agent, or Firm* — LAVERY, DE BILLY, LLP; Gonzalo Lavin (57) ABSTRACT

A system and method for system for controlling power supplied to electronic components (12) powered by a battery (11) of a vehicle (10), the system comprising: a vehicle control unit (14) including a controller (16) and a transmitter (18) for transmitting wirelessly vehicle control signals (20); a wireless latching relay (22) including a receiver (24) configured for receiving the vehicle control signals (20) from the transmitter (18), and a latching relay (26); wherein the relay (26) is connected in series with the negative terminal (25) or positive terminal (29) of the battery (11).

5 Claims, 8 Drawing Sheets

(56) References Cited

U.S. PATENT DOCUMENTS

2022/0341217 A1\* 10/2022 Cristache ............... G06Q 30/01
2023/0038677 A1\* 2/2023 Wang ..................... B62H 5/145

FOREIGN PATENT DOCUMENTS

| | | | | | |
|---|---|---|---|---|---|
| JP | 2019199099 | A | \* | 11/2019 | |
| KR | 20120054427 | A | \* | 5/2012 | |
| KR | 20140056684 | A | \* | 5/2014 | |
| KR | 20200071201 | A | \* | 6/2020 | |
| WO | WO-2021168487 | A1 | \* | 8/2021 | ............ G08B 13/06 |

\* cited by examiner

Screenshot of the controller

SYSTEM AND METHOD USING WIRELESS LATCHING RELAY FOR VEHICLE FLEET MANAGEMENT INVENTORY

CROSS REFERENCE TO RELATED APPLICATION

This application claims priority on U.S. Provisional Application No. 63/260,803, filed on Sep. 1, 2021, which is herein incorporated by reference in its entirety.

FIELD OF THE INVENTION

The present invention relates to after-market installations such as car-sharing applications or fleet management for vehicles. In particular, the invention relates to a vehicle security system and methods that prevent thefts of vehicles.

BACKGROUND OF THE INVENTION

New technologies in the domain of the automotive security restrain after-market installations, such as car-sharing or fleet management applications in vehicles. In some cases, the after-market products are not compatible with these automotive innovations. Formerly, the driver would mechanically insert a key in the barrel in order to start the vehicle. Today, many vehicles electronically validate the key that the driver is attempting to use to start the vehicle and either is permissive and allows the vehicle to start, or is restrictive and inhibits the vehicle from starting. In this case, the key or proximity remote is able to communicate to the vehicle using radio signals. If the pre-programmed key or remote is not within proximity when the driver attempts to start the vehicle various countermeasures inhibit the vehicle from starting. However, if a valid proximity remote was left somewhere within the vehicle, the vehicle would never inhibit itself from starting thus allowing anyone to start the vehicle at any time.

Thieves now have access to several technologies to start cars without the key, or steal vehicle keys.

It is known to immobilize a vehicle is by using interrupting circuits in the vehicle. Most known systems interrupt the diagnostic port wiring, preventing theft to connect into the vehicle diagnostic port. Such solution does not prevent relay attacks or if the key is being stolen.

The drawbacks of known vehicle anti-theft systems and methods is that they are relatively complex and expensive. There is therefore a need for a simple yet efficient anti-theft system and method that can be used in vehicle sharing applications.

SUMMARY OF THE INVENTION

According to the present invention, there is provided a system for controlling power supplied to electronic components powered by a battery of a vehicle, the system comprising: a vehicle control unit including a controller and a transmitter for transmitting wirelessly vehicle control signals; and a wireless latching relay including a receiver configured for receiving the vehicle control signals from the transmitter, and a latching relay; wherein the relay is connected in series with either the negative terminal or positive terminal of the battery.

According to another aspect of the present invention, there is provided a method for controlling power supplied to electronic components powered by a battery of a vehicle, the method comprising: providing a vehicle control unit including a controller and a transmitter for transmitting wirelessly vehicle sharing control signals; installing a wireless latching relay including a receiver configured for receiving the vehicle control signals from the transmitter, and a latching relay; and connecting the relay in series with either the negative terminal or positive terminal of the battery.

In embodiments, a vehicle is immobilized by using interrupting circuits in the vehicle. This is achieved by installing a wireless latching relay on the negative pole of the vehicle's battery. This achieves full control over the vehicle's entire system. Once the present system is installed a user can remotely connect or disconnect the battery of the vehicle to ensure a secure and efficient way to prevent theft. Once the present system is activated the battery life is also preserved. Most systems interrupt diagnostic port wiring, preventing theft to connect into the vehicle diagnostic port. Such prior solution does not prevent relay attacks or if the key is being stolen.

In embodiments, there is provided a method to prevent theft by de-powering the vehicle's electronics while allowing normal road test use when a vehicle is selected by an authorized user.

In embodiments, there is provided a wireless latching relay that may be controlled by different interfaces: web, mobile application or computer software. The interfaces can communicate with the wireless relay via RF, Bluetooth or with a cellular connection. The wireless latching relay is used to protect a vehicle fleet quickly and efficiently. The wireless latching relay is connected to the negative pole of the car battery of the vehicle. When activated, the device disconnects the ground of the battery. Once activated, the vehicle has no power in it. This action prevents the vehicle from locking, unlocking, starting and even helps preserve the battery life. When deactivated the wireless latching relay reconnects the ground of the battery which allows the vehicle to regain all of its original functions.

In embodiments, there is provided a device that is easy to install and can be quickly removed. To protect a vehicle, a user simply has to install the device on the battery and pair it to its manager system and the vehicle is protected. Because of the easy installation a user can protect a vehicle in a matter of minutes making it perfect to protect a large fleet. Because of its ease of installation, the present system and method are an ideal solution to protect a vehicle fleet. Also, the wireless latching relay may be switched from one vehicle to another making it reusable.

In embodiments, the system and method prevent car theft efficiently. Most of the solutions that exist on the market take long to install and cannot be easily removed. Making it not efficient for commercial fleets that have lots of turnover. Besides, those solutions do not actively protect the vehicle from being stolen, these rather help in finding the vehicle once these are stolen or they notify when the vehicle is being tampered with. The present system and method provide a solution that prevents a thief from leaving with the vehicle and making it very difficult to steal. In addition, the present invention makes it simple to control and manage a vehicle fleet. Additionally, the management system allows the user to activate or deactivate the whole fleet by the click of a button making it the easiest and fastest solution to protect the fleet. Furthermore, the user is able to activate or deactivate a single vehicle making it an easy solution for preventing theft in a vehicle fleet.

In embodiments, the wireless relay allows to protect a vehicle. Indeed, this wireless technology provides the ability to protect the vehicle and lower the battery consumption of the vehicle preventing problems for vehicles that are unused for a long time. This wireless relay is the part that is used to interrupt the connection of the battery to the vehicle. And because it is a solid state relay it is able to maintain its state even if there is no power on it.

In embodiments, the installation system allows proper fleet management and control systems. The pole connection and brace of the device provide the opportunity to add the device on a vehicle in a matter of minutes. With the installation method it becomes easy to add and remove the device on a vehicle independently of the make, model or year thereof. Furthermore, one may use the exact same installation process for every vehicle on the market. To install the user simply disconnects the wire connected to the negative pole of the battery. The user then slides the brace of the device on the battery pole. The user then attaches the previously disconnected wire to the top of the device. Thereafter, the user connects the red wire of the device to the 12V or positive pole of the battery of the vehicle.

In embodiments, the manager system gives the user access to various commands to control the device installed on the vehicle. The manager system allows the user to activate the device and is able to arm or disarm the vehicle. The manager system is easy to use and is adapted for small or big fleets. The manager system is used to control the wireless latching relay, it gives the user the ability to activate it or deactivate it. Also, the manager system can have multiple users that have different rights to access the devices. The manager system can send a command to one device or to the whole fleet. The wireless latching relay is assembled with an easy to install system that is compatible with all the vehicles on the market. The system is composed of a brace to install on top of the vehicle battery, a pole-like connector and a fused 12 Volt wire. The relay can be easily paired with the manager system for the easiest installation.

In embodiments, the installation system solves problems in the existing systems. The installation makes the product easy to use and easy to add and remove for rapid turnover. That ensures that an entire fleet is protected. For the manager system, its interface is configured to specifically manage and control a fleet. Furthermore, it is one of the reasons that the device is adapted to small and big fleets. At last, the system protects vehicle fleets with the main goal of preventing vehicles from being stolen. The device is configured to protect against theft by disabling the main circuit of a vehicle at the root. By interrupting the connection of the battery, the system is configured to lower the power consumption of the unused vehicle and prevent multiple theft techniques.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Referring now to FIG. 1 to FIG. 5, and in accordance with an illustrative embodiment of the present invention, a system for controlling power supplied to electronic components 12 that are powered by a battery 11 of a vehicle 10, will now be described. The system includes vehicle control unit 14 with a controller 16 and a transmitter 18 for transmitting wirelessly vehicle control signals 20. The system also includes a device 19 that includes a wireless latching relay 22 with a receiver 24 configured for receiving the vehicle control signals 20 from the transmitter 18, and a latching relay 26. The device 19 also includes a first terminal 21 and a second terminal 23 that are respectively connectable to the negative terminal 25 of the battery 11 and to the ground cable 27 of the battery 11. The first terminal 21 and second terminal 23 of the device 19 are connected across the latching relay 26.

In use, the latching relay 26 of the wireless latching relay 22 is connected in series with the negative terminal 25 of the battery 11 and the ground cable 27 of the battery 11 of the vehicle 10. When activated, the latching relay 22 disconnects the ground of the battery 11. Once the latching relay 22 is activated by means of vehicle control signals 20, the electronic components 12 of the vehicle 10 receive no power. This action prevents the vehicle 10 from locking, unlocking, starting and even helps preserve the battery life. When deactivated, the latching relay 22 is reconnected to the ground of the battery 11 which allows the vehicle to regain all of its original functions.

As persons skilled in the art will understand, although the latching relay 26 of the device 19 is shown connected across the negative terminal 25 of the battery 11 and the ground cable, the device 19 may be configured so that it is connected across the positive terminal 29 of the battery 11 and the live positive cable 31. This configuration would achieve the same result as described above.

Figure 1:
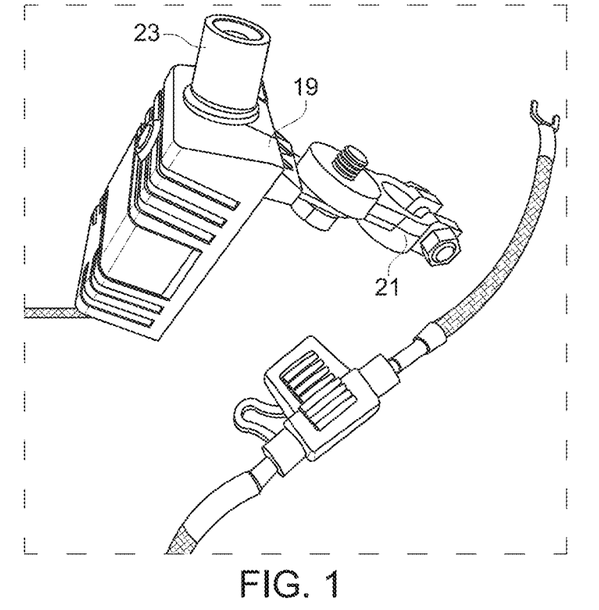
FIG. 1 is a perspective view of a device, according to a preferred embodiment of the present invention.
Figure 2:
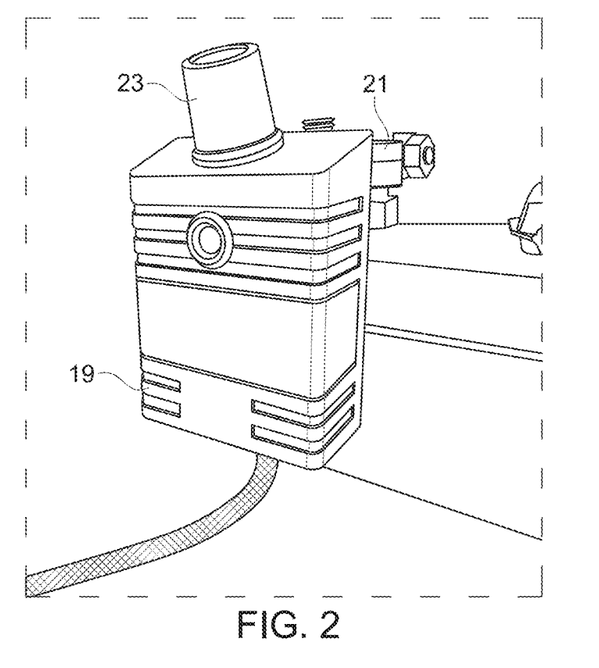
FIG. 2 is perspective view of the device shown in FIG. 1 mounted on a pairing base station, according to a preferred embodiment of the present invention.
Figure 3:
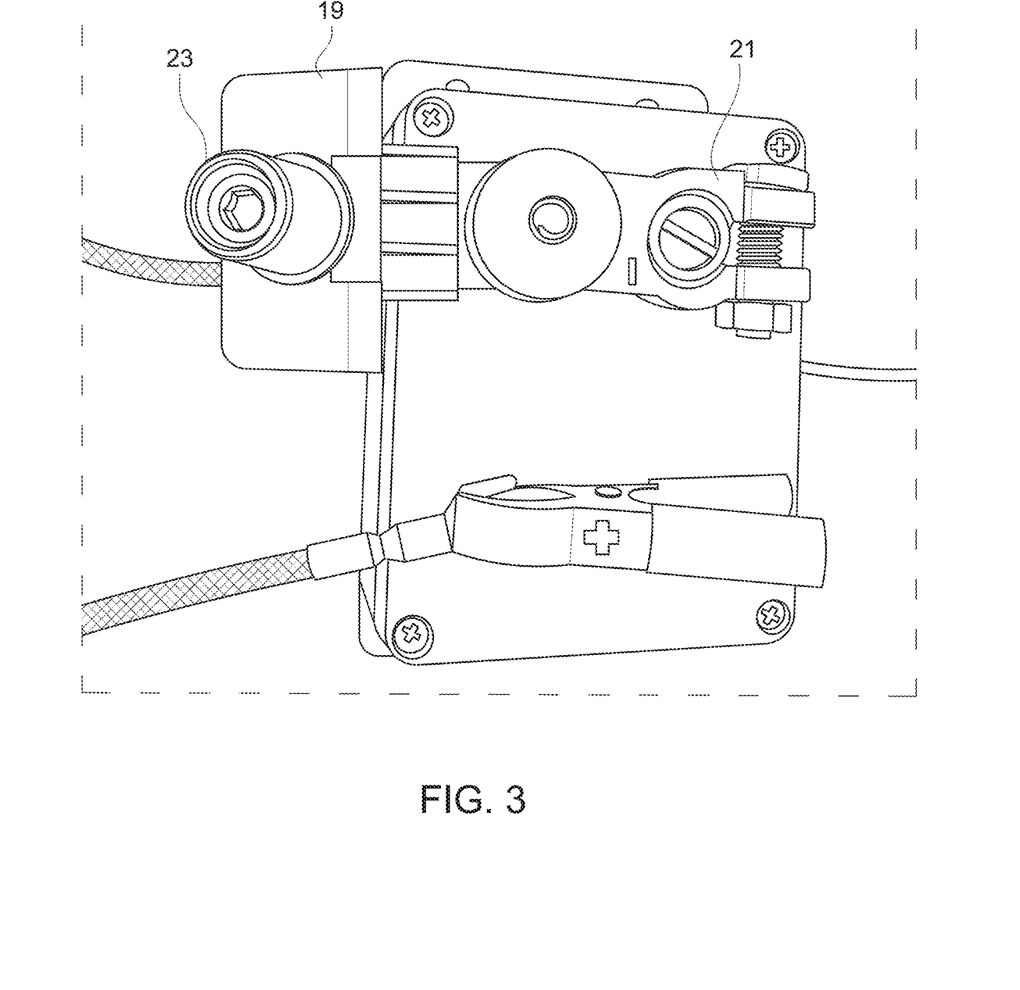
FIG. 3 is top view of the device shown in FIG. 2 mounted on a pairing base station, according to a preferred embodiment of the present invention.
Figure 4:
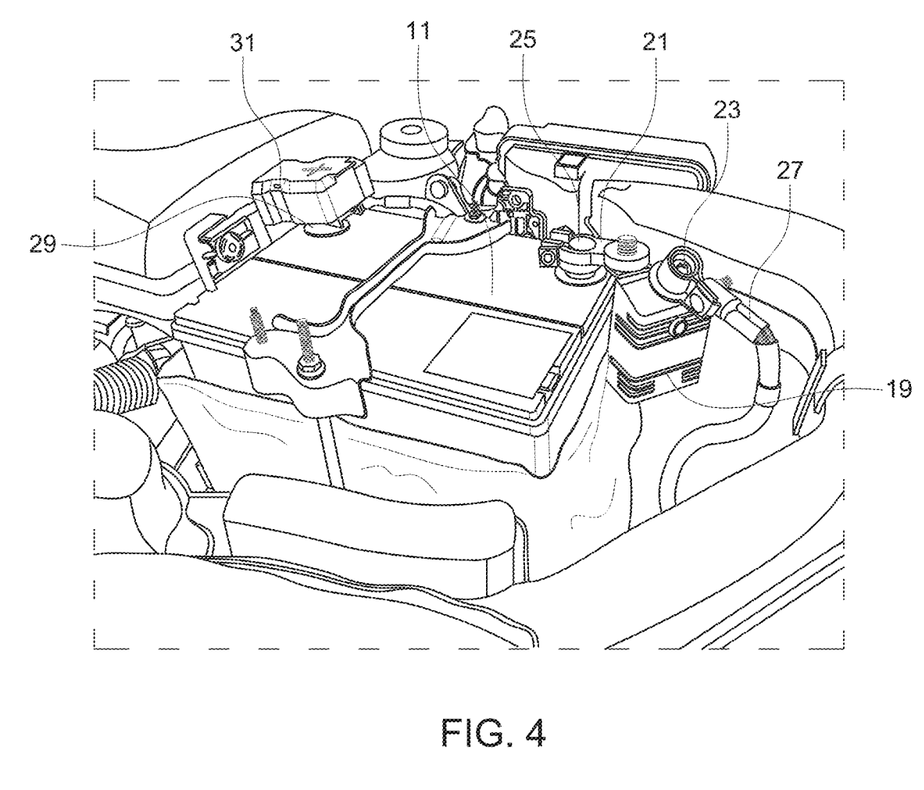
FIG. 4 is a perspective view of the device shown in FIG. 1 mounted on a battery of a vehicle, according to a preferred embodiment of the present invention

Referring now to FIG. 2, in addition to FIG. 1, in this example, the wireless latching relay 22 is shown connected to a 12 V power supply or ignition 23 and at ground at Pin 2. The wireless relay 22 is connected to first end 28 and second end 30 of the vehicle harness that 12 has been cut.

Figure 5:
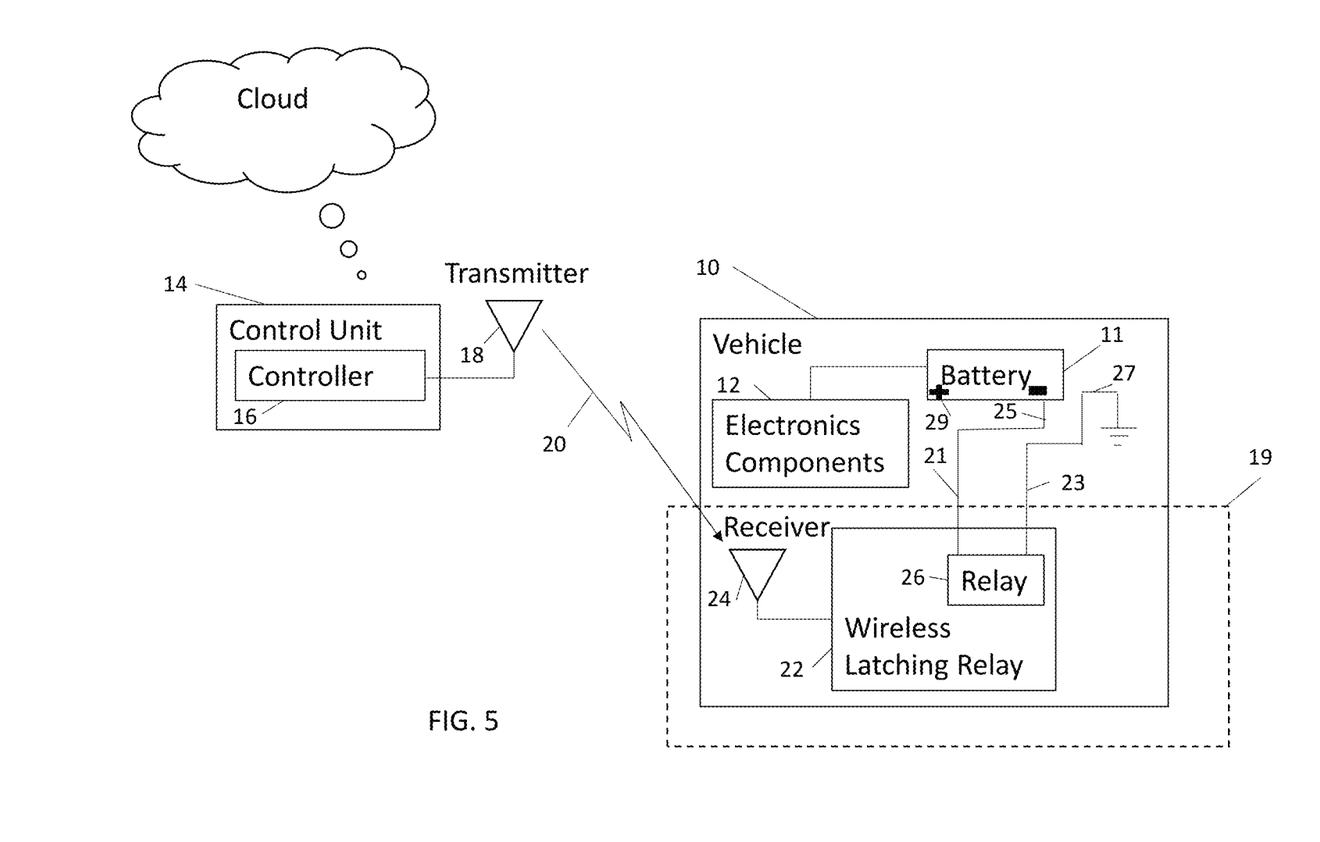
FIG. 5 is a block diagram of a system, according to a preferred embodiment of the present invention.
Figure 6:
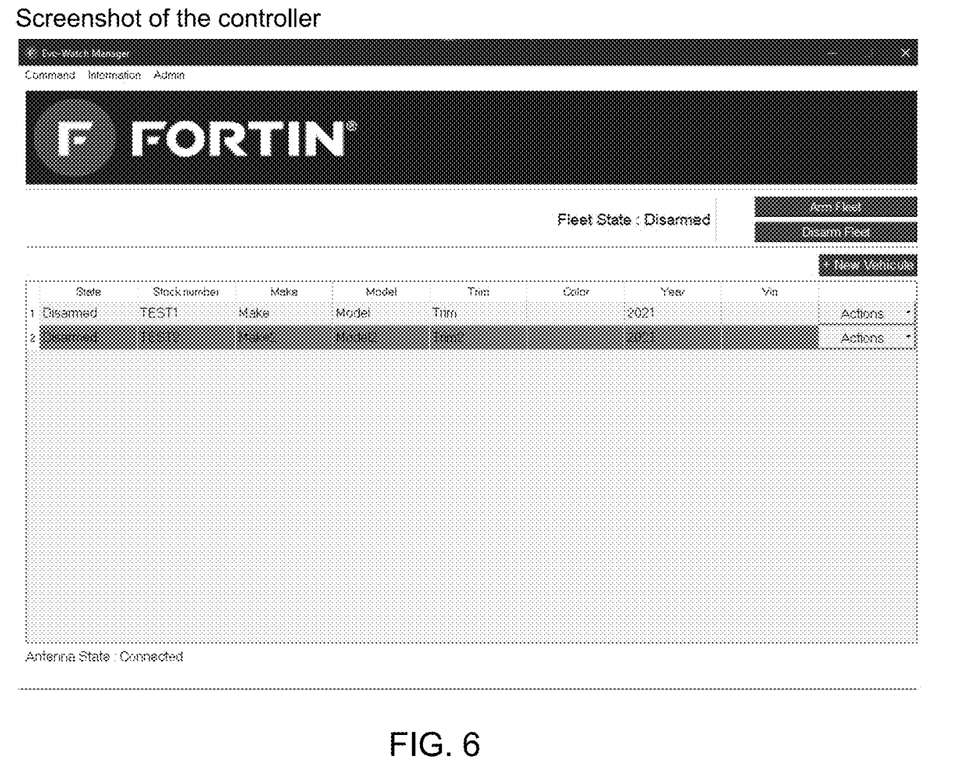
FIG. 6 to FIG. 8 are views of an interface of a management system, according to a preferred embodiment of the present invention.
Figure 7:
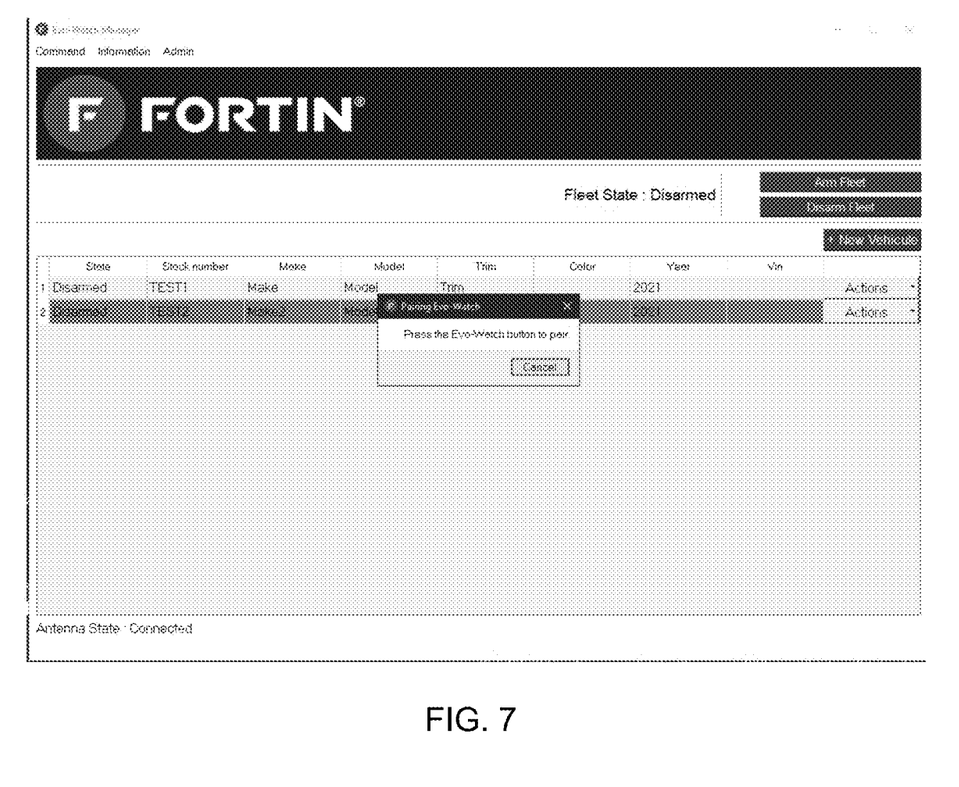
Figure 8:
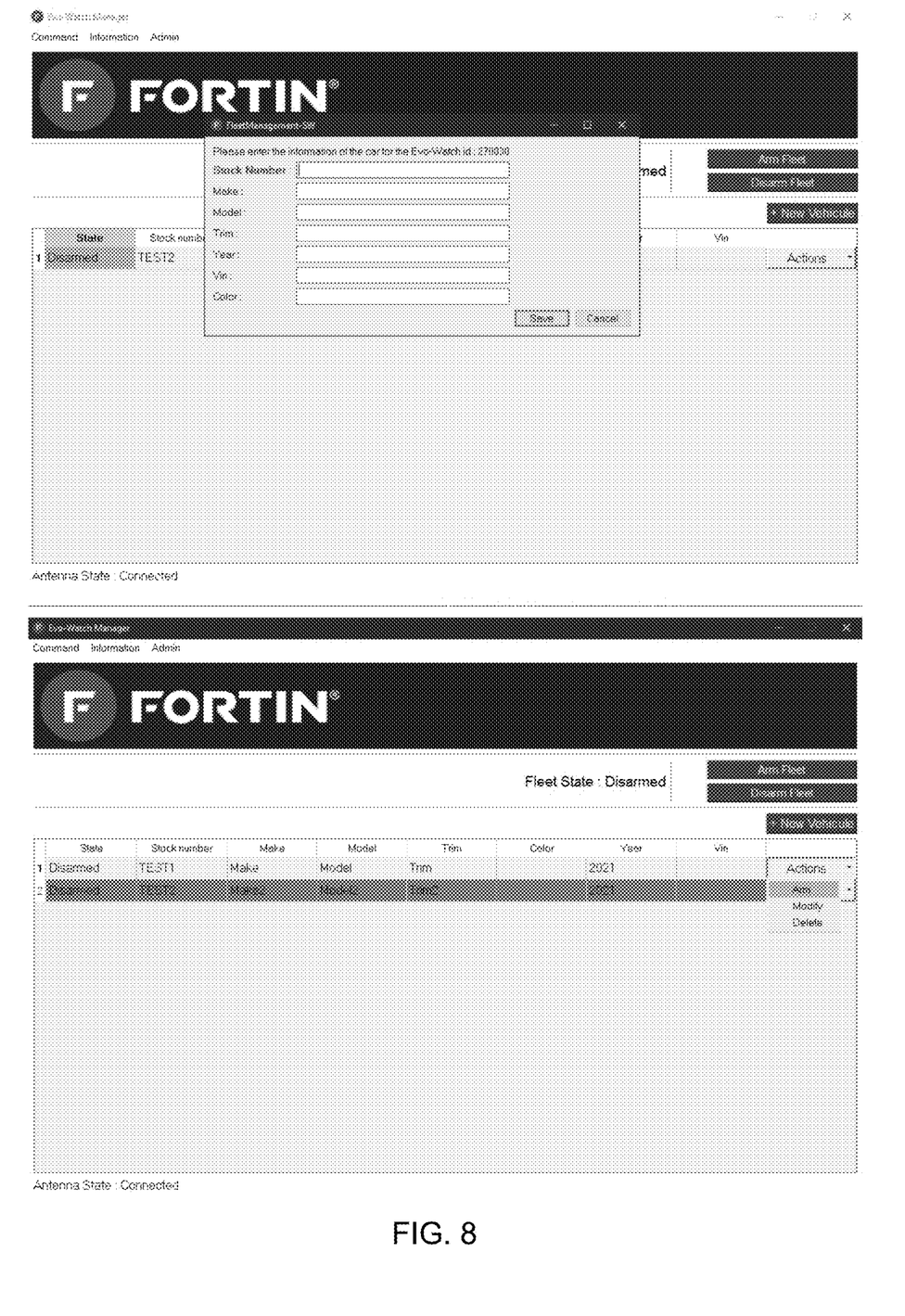

In embodiments, the transmitter 18 may include a microcontroller unit (MCU) and a power supply connected to a vehicle battery 11. The wireless latching relay 22 with the receiver 24 are configured for receiving the vehicle sharing control signals 20 from the transmitter 18, and a latching relay 26. The wireless latching relay 22 may include a microcontroller unit (MCU) and a power supply connected to the vehicle battery 11 or ignition.

Conventional relays are unreliable, easy to deactivate and drain the vehicle battery.

However, a latching relay, also called impulse, bistable, keep, or stay relay, or simply latch, maintains either contact position indefinitely without power applied to the coil. The advantage is that one coil consumes power only for an instant while the relay is being switched, and the relay contacts retain this setting across a power outage. A latching relay allows remote control of building lighting without the hum that may be produced from a continuously (AC) energized coil.

Figure 9:
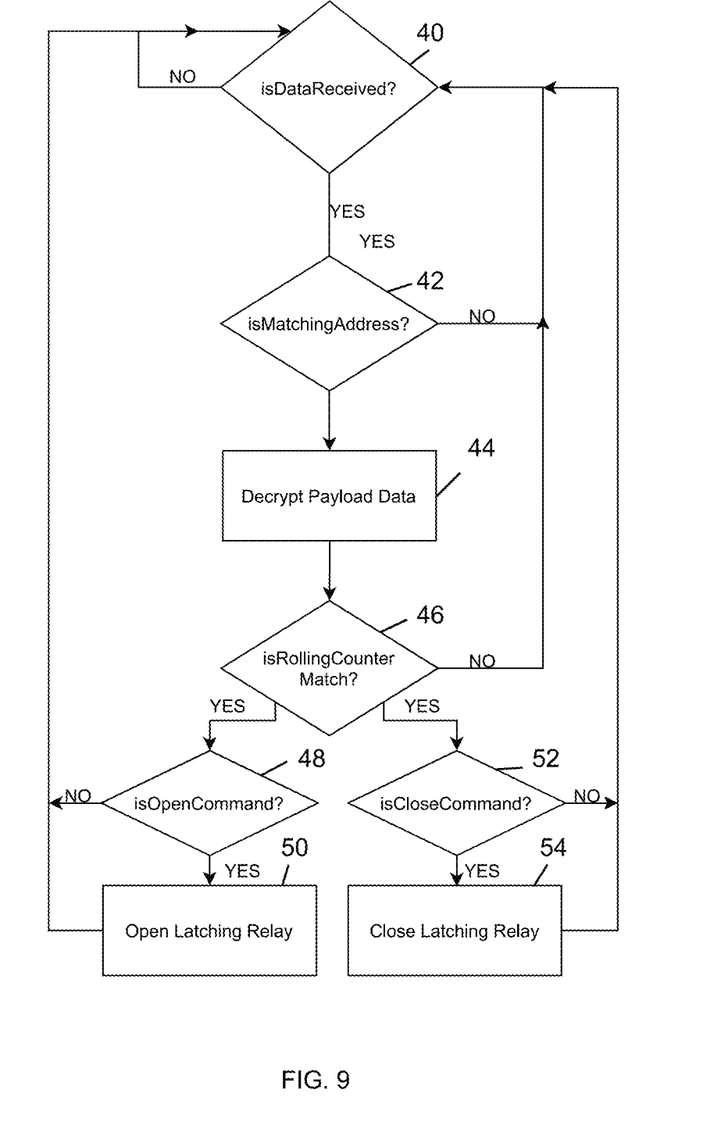
FIG. 9 is a flowchart diagram of an operation of a system, according to a preferred embodiment of the present invention.

Referring to FIG. 9, a method of operating a system according to a preferred embodiment of the present invention is shown. The method begins by verifying if data is received at step 40. The method continues by verifying if the data matches an address at step 42. The method continues by decrypting payload data at step 44. The method continues by verifying if a rolling counter is a match at step 46. The method continues by verifying if an open command is received at step 48 and if so, opens the latching relay 26 at step 50. The method also verifies if a close command is received at step 52 and if so, closes the latching relay 26 at step 54.

The scope of the claims should not be limited by the preferred embodiments set forth in the examples but should be given the broadest interpretation consistent with the description as a whole.

The invention claimed is:

1. A system for preventing theft of at least one vehicle (10) among a fleet of vehicles, the system being configured to control power supplied to electronic components (12) powered by a battery (11) of the at least one vehicle (10), the system comprising:
   a cloud-based manager system including a user interface configured to send control commands to disable the battery (11) of the at least one vehicle (10) of the fleet of vehicles;
   a vehicle control unit (14) including a controller (16) and a transmitter (18) for transmitting wirelessly vehicle control signals (20), the controller (14) being configured to communicate with the cloud-based manager system and receive the control commands from the cloud-based manager system to disable the battery (11) of the at least one vehicle (10); and
   a wireless latching relay (22) including a receiver (24) configured for receiving the vehicle control signals (20) from the transmitter (18), and a latching relay (26);
   wherein the latching relay (26) is connected in series with either the negative terminal (25) or positive terminal (29) of the battery (11), and
   wherein both the control commands from the cloud-based manager system and the control signals (20) received by the receiver (24) control the latching relay (26) to disable the battery (11) of the at least one vehicle (10).

2. The system of claim 1, wherein the transmitter (18) and the wireless latching relay (22) communicate using at least one of radio-frequency (RF) signals, Bluetooth and cellular.

3. The system of claim 1, wherein the transmitter (18) includes a microcontroller unit (MCU).

4. The system of claim 3, wherein the microcontroller unit (MCU) is powered by a power supply connected to the battery (11) of the vehicle (10).

5. A method for preventing theft of at least one vehicle (10) among a fleet of vehicles and controlling power supplied to electronic components (12) powered by a battery (11) of the at least one vehicle (10), the method comprising:
   sending control commands from a cloud-based manager system including a user interface to disable the battery (11) of the at least one vehicle (10) of the fleet of vehicles;
   providing a vehicle control unit (14) including a controller (16) for receiving the control commands from the cloud-based manager system and a transmitter (18) for transmitting wirelessly vehicle control signals (20) to disable the battery of the at least one vehicle (10);
   installing a wireless latching relay (22) including a receiver (24) configured for receiving the vehicle control signals (20) from the transmitter (18), and a latching relay (26);
   connecting the relay (26) in series with either the negative terminal (25) or positive terminal (29) of the battery (11); and
   transmitting the vehicle control signals (20) from the transmitter (18) to the receiver (24) so that the wireless latching relay (22) opens the latching relay (26) and disconnects the battery (11) from the negative terminal (25) or positive terminal (29), whereby the electronic components (12) of the at least one vehicle (10) receive no power from the battery (11).

* * * * *